United States Patent
Candello et al.

(10) Patent No.: US 11,252,202 B2
(45) Date of Patent: Feb. 15, 2022

(54) SUPPORT REQUEST ASSIGNMENT USING PACE OF CONVERSATION

(71) Applicant: International Business Machines Corporation, Armonk, NY (US)

(72) Inventors: Heloisa Caroline De Souza Pereira Candello, Sao Paulo (BR); Marisa Affonso Vasconcelos, São Paulo (BR); Jaione Tirapu Azpiroz, Rio de Janeiro (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/841,958

(22) Filed: Apr. 7, 2020

(65) Prior Publication Data

US 2021/0314370 A1 Oct. 7, 2021

(51) Int. Cl.
*H04L 29/06* (2006.01)
*H04L 12/58* (2006.01)
*H04L 29/08* (2006.01)

(52) U.S. Cl.
CPC ........ *H04L 65/1069* (2013.01); *H04L 51/046* (2013.01); *H04L 65/1006* (2013.01); *H04L 65/1016* (2013.01); *H04L 65/1083* (2013.01); *H04L 67/143* (2013.01); *H04L 67/38* (2013.01)

(58) Field of Classification Search
CPC ............. H04L 65/1069; H04L 65/1083; H04L 67/143; H04L 65/1016; H04L 67/38; H04L 65/1006; H04L 51/046
See application file for complete search history.

(56) References Cited

U.S. PATENT DOCUMENTS

| | | | |
|---|---|---|---|
| 6,728,679 B1 | 4/2004 | Strubbe et al. | |
| 6,731,307 B1 | 5/2004 | Strubbe et al. | |
| 6,865,257 B1 | 3/2005 | Drew et al. | |
| 7,336,779 B2 | 2/2008 | Boyer et al. | |
| 7,401,320 B2 | 7/2008 | Brunet et al. | |
| 7,792,773 B2 | 9/2010 | McCord et al. | |
| 8,386,252 B2 | 2/2013 | Michaelis | |

(Continued)

FOREIGN PATENT DOCUMENTS

| | | |
|---|---|---|
| ES | 2709213 T3 | 4/2019 |
| JP | 2018207143 A | 12/2018 |

(Continued)

*Primary Examiner* — Philip C Lee
(74) *Attorney, Agent, or Firm* — Patterson + Sheridan, LLP

(57) ABSTRACT

Aspects discussed herein include a computer-implemented method comprising receiving a support request from a user, and during a current support session responsive to the support request, performing textual analysis of one or more inputs provided by the user during one or both of: (i) the current support session and (ii) one or more previous support sessions. The method further comprises applying one or more features determined by the textual analysis to a model to classify the user into a first class of a predefined plurality of classes that describe a pace of conversation during the current support session. The method further comprises, based on the classification of the user, assigning the support request to be fulfilled by a first operator of a predefined plurality of support operators.

20 Claims, 5 Drawing Sheets

(56) References Cited

U.S. PATENT DOCUMENTS

| | | | |
|---|---|---|---|
| 8,396,205 B1* | 3/2013 | Lowry | H04M 3/5175 |
| | | | 379/265.12 |
| 9,008,283 B2 | 4/2015 | Riahi et al. | |
| 10,216,827 B2 | 2/2019 | King et al. | |
| 10,263,862 B1 | 4/2019 | Benkreira et al. | |
| 10,869,253 B2* | 12/2020 | Barak | G06Q 30/01 |
| 10,872,119 B1* | 12/2020 | Walters | G06F 16/906 |
| 2004/0210661 A1 | 10/2004 | Thompson | |
| 2005/0286705 A1 | 12/2005 | Contolini et al. | |
| 2010/0002685 A1 | 1/2010 | Shaham et al. | |
| 2012/0087486 A1* | 4/2012 | Guerrero | G06Q 10/06311 |
| | | | 379/265.02 |
| 2015/0089399 A1 | 3/2015 | Megill et al. | |
| 2016/0094492 A1 | 3/2016 | Li et al. | |
| 2016/0352907 A1* | 12/2016 | Raanani | G06N 20/00 |
| 2017/0111507 A1* | 4/2017 | McGann | H04L 67/02 |
| 2017/0358296 A1* | 12/2017 | Segalis | G06F 40/205 |
| 2018/0077099 A1* | 3/2018 | Silva | H04L 12/1831 |
| 2018/0165062 A1* | 6/2018 | Yoo | G16H 40/20 |
| 2018/0349917 A1 | 12/2018 | Gaedcke et al. | |
| 2019/0361926 A1* | 11/2019 | Rogynskyy | G06Q 10/109 |
| 2021/0043320 A1* | 2/2021 | Malkenson | G16H 50/20 |

FOREIGN PATENT DOCUMENTS

| | | |
|---|---|---|
| KR | 20060113313 A | 11/2006 |
| KR | 101161164 B1 | 7/2012 |
| WO | 0184266 A2 | 11/2001 |
| WO | 20100093678 A1 | 8/2010 |

* cited by examiner

SUPPORT REQUEST ASSIGNMENT USING PACE OF CONVERSATION

BACKGROUND

The present disclosure relates to fulfillment of support requests, and more specifically, to assignment of support requests using a determined pace of conversation during a current support session.

Customer service is an integral and ongoing part of a customer's purchase of a product or service. Effectiveness and timeliness may be important metrics to ensure customer satisfaction, and other metrics may be monitored by the customer service provider to ensure an efficient employment of personnel and/or other resources.

SUMMARY

According to one embodiment of the present disclosure, a computer-implemented method comprises receiving a support request from a user, and during a current support session responsive to the support request, performing textual analysis of one or more inputs provided by the user during one or both of: (i) the current support session and (ii) one or more previous support sessions. The method further comprises applying one or more features determined by the textual analysis to a model to classify the user into a first class of a predefined plurality of classes that describe a pace of conversation during the current support session. The method further comprises, based on the classification of the user, assigning the support request to be fulfilled by a first operator of a predefined plurality of support operators.

According to one embodiment of the present disclosure, a system comprises one or more computer processors configured to perform an operation comprising receiving a support request from a user, and during a current support session responsive to the support request, performing textual analysis of one or more inputs provided by the user during one or both of: (i) the current support session and (ii) one or more previous support sessions. The operation further comprises applying one or more features determined by the textual analysis to a model to classify the user into a first class of a predefined plurality of classes that describe a pace of conversation during the current support session. The operation further comprises, based on the classification of the user, assigning the support request to be fulfilled by a first operator of a predefined plurality of support operators.

According to one embodiment of the present disclosure, a computer program product comprising a computer-readable storage medium having computer-readable program code embodied therewith. The computer-readable program code is executable by one or more computer processors to perform an operation comprising receiving a support request from a user, and during a current support session responsive to the support request, performing textual analysis of one or more inputs provided by the user during one or both of: (i) the current support session and (ii) one or more previous support sessions. The operation further comprises applying one or more features determined by the textual analysis to a model to classify the user into a first class of a predefined plurality of classes that describe a pace of conversation during the current support session. The operation further comprises based on the classification of the user, assigning the support request to be fulfilled by a first operator of a predefined plurality of support operators.

DETAILED DESCRIPTION

Figure 1:
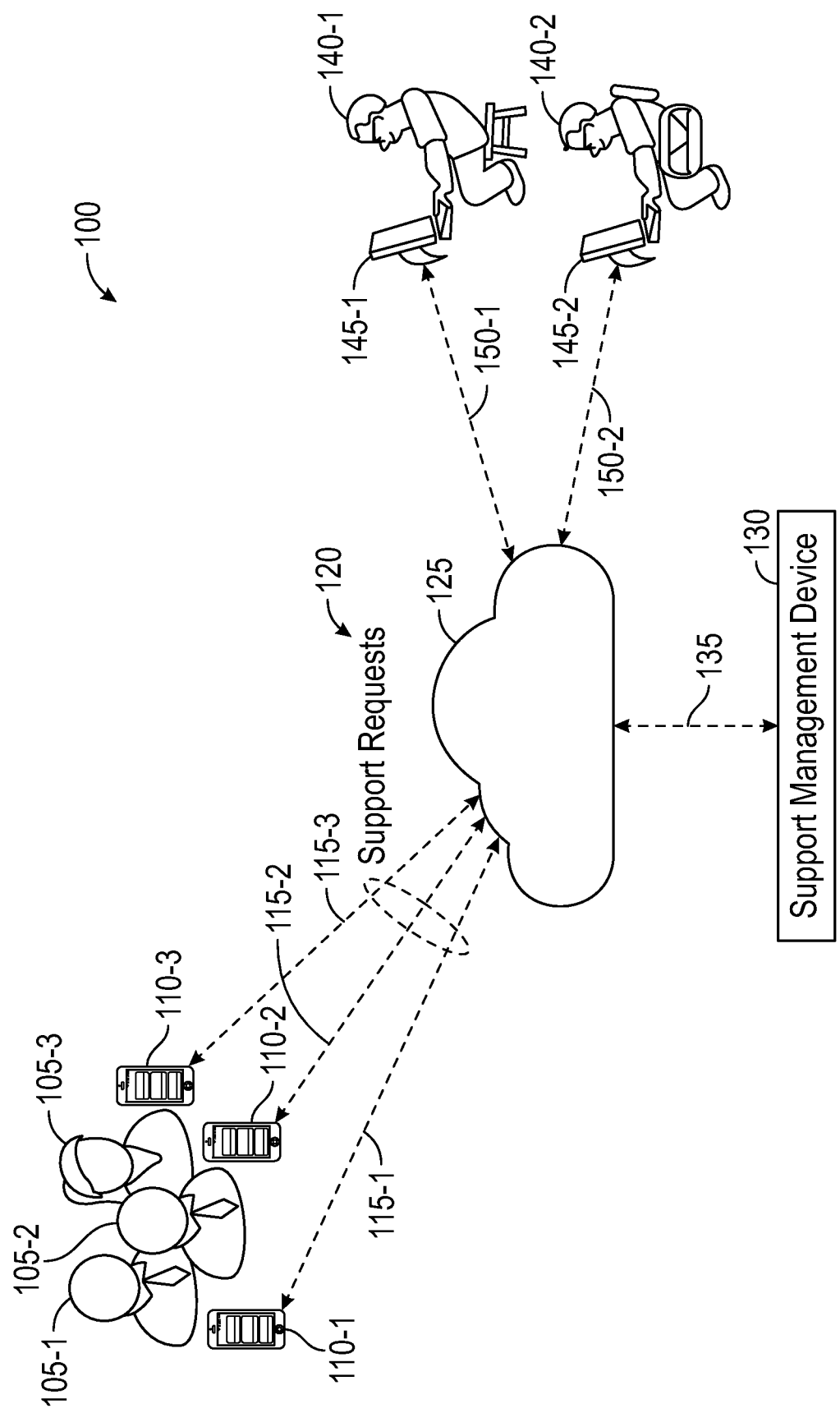
FIG. 1 is a diagram of an exemplary system having a support management device, according to one or more embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In many cases, providers of a product or service are also responsible to provide customer service before, during, and/or after the purchase of the product or service. Effectiveness and timeliness of the customer service may be important metrics to ensure customer satisfaction with the product or service. For example, a customer may become frustrated if the customer is kept on hold during a support session, or if the customer service is perceived as ineffectively addressing the customer's concerns.

In some embodiments, a computer-implemented method comprises receiving a support request from a user, and during a current support session responsive to the support request, performing textual analysis of one or more inputs provided by the user during one or both of: (i) the current support session and (ii) one or more previous support sessions. The method further comprises applying one or more features determined by the textual analysis to a model to classify the user into a first class of a predefined plurality of classes that describe a pace of conversation during the current support session. The method further comprises, based on the classification of the user, assigning the support request to be fulfilled by a first operator of a predefined plurality of support operators.

By characterizing the pace of conversation, the customer service provider may maintain a dynamic indication of the customer's levels of satisfaction and/or engagement during the support session. Using the pace of conversation, the customer service provider may dynamically assign a support request (e.g., prioritizing the support request over other support requests, reassigning the support request to be fulfilled by another support operator) to improve customer satisfaction and/or engagement. For example, dynamically assigning may be effective to reduce wait times experienced by a customer. Further, using the pace of conversation allows the customer service provider to dynamically manage the assignment of support operators to support requests, e.g., based on a number and/or complexity of support requests that are concurrently assigned to a support operator. For example, the customer engagement generally indicates whether the customer is doing something else apart from interacting with the support session, and the level of engagement across a set of concurrent customers assigned to a support operator can indicate whether the support operator is overloaded.

FIG. 1 is a diagram 100 of an exemplary system having a support management device 130, according to one or more embodiments. In the diagram 100, each user of a plurality of users 105-1, 105-2, 105-3 (generically, a user 105) has a respective computing device 110-1, 110-2, 110-3 (generically, a computing device 110). Each of the computing devices 110-1, 110-2, 110-3 may have any suitable implementation, such as a desktop computing device, a mobile computing device (e.g., smartphone, tablet), a wearable computing device, and other electronic devices (e.g., printers, smart televisions, smart appliances).

Each of the computing devices 110-1, 110-2, 110-3 is connected via a respective communicative link 115-1, 115-2, 115-3 to a network 125. The network 125 may represent one or more networks of any suitable type(s) for communicatively coupling the computing devices 110-1, 110-2, 110-3 with at least computing devices 145-1, 145-2 (generically, a computing device 145) of a plurality of support operators 140-1, 140-2 (generically, a support operator 140). For example, the network 125 may comprise the Internet, a local area network (LAN), a wide area network (WAN), and/or a wireless network. Each of the communicative links 115-1, 115-2, 115-3 may have any suitable implementation, such as copper transmission cables, optical transmission fibers, wireless transmission, routers, firewalls, switches, gateway computers, and/or edge servers.

The users 105-1, 105-2, 105-3 are able to generate support requests 120 using the respective computing devices 110-1, 110-2, 110-3. Each of the computing devices 110-1, 110-2, 110-3 comprises one or more input devices for generating the support requests 120. Some non-limiting examples of the input devices include a touch screen for receiving inputs from finger(s) and/or a stylus of the respective user 105, a keyboard, and a microphone for receiving audio input.

The support requests 120 are communicated via the network 125 to be fulfilled by one or more of the plurality of support operators 140-1, 140-2. The computing devices 145-1, 145-2 are connected to the network 125 via respective communicative links 150-1, 150-2, which may be configured similarly to the communicative links 115-1, 115-2, 115-3. The support requests 120 may be communicated with any suitable formatting. In some embodiments, the support requests 120 are formatted as text. In some embodiments, the support requests 120 are formatted as audio.

In some embodiments, the system further comprises the support management device 130, which is connected to the network 125 via a communicative link 135. The communicative link 135 may be configured similarly to the communicative links 115-1, 115-2, 115-3. The support management device 130 is configured to manage distribution (or assignment) of the support requests 120 to the support operators 140. In some embodiments, the support management device 130 opens a support session for each support request 120 received from the users 105, and manages the support sessions until resolution or other disposition of the support request 120.

During a support session, the support operator 140 assigned to the support request 120 may converse with the corresponding user 105 via the network 125 (i.e., using various ones of the communicative links 115-1, 115-2, 115-3, 150-1, 150-2). The support session may have any suitable formatting. In some embodiments, the support session is an asynchronous chat in which the support operator 140 and the user 105 intermittently exchange text-based messages about the support request 120. Beneficially, the asynchronous chat may permit the support operator 140 to address one or more other support requests 120 concurrently, and the increased throughput may support reduced wait times for a support operator 140 to begin addressing a support request 120.

In some embodiments, the support management device 130 comprises a singular computing device. However, in other embodiments the functionality of the support management device 130 may be included in a computing device 145 of a support operator 140, may be distributed among a number of computing devices connected to the network 125 (e.g., distributed among the computing devices 145-1, 145-2), and so forth.

In some embodiments, the support operators 140-1, 140-2 comprise human operators that are operating the respective computing devices 145-1, 145-2. However, other implementations may have the support operators 140-1, 140-2 as "virtual" support operators executing on the computing devices 145-1, 145-2. For example, the support operators 140-1, 140-2 may be implemented as chatbots or other conversational artificial intelligence (AI).

Figure 2:
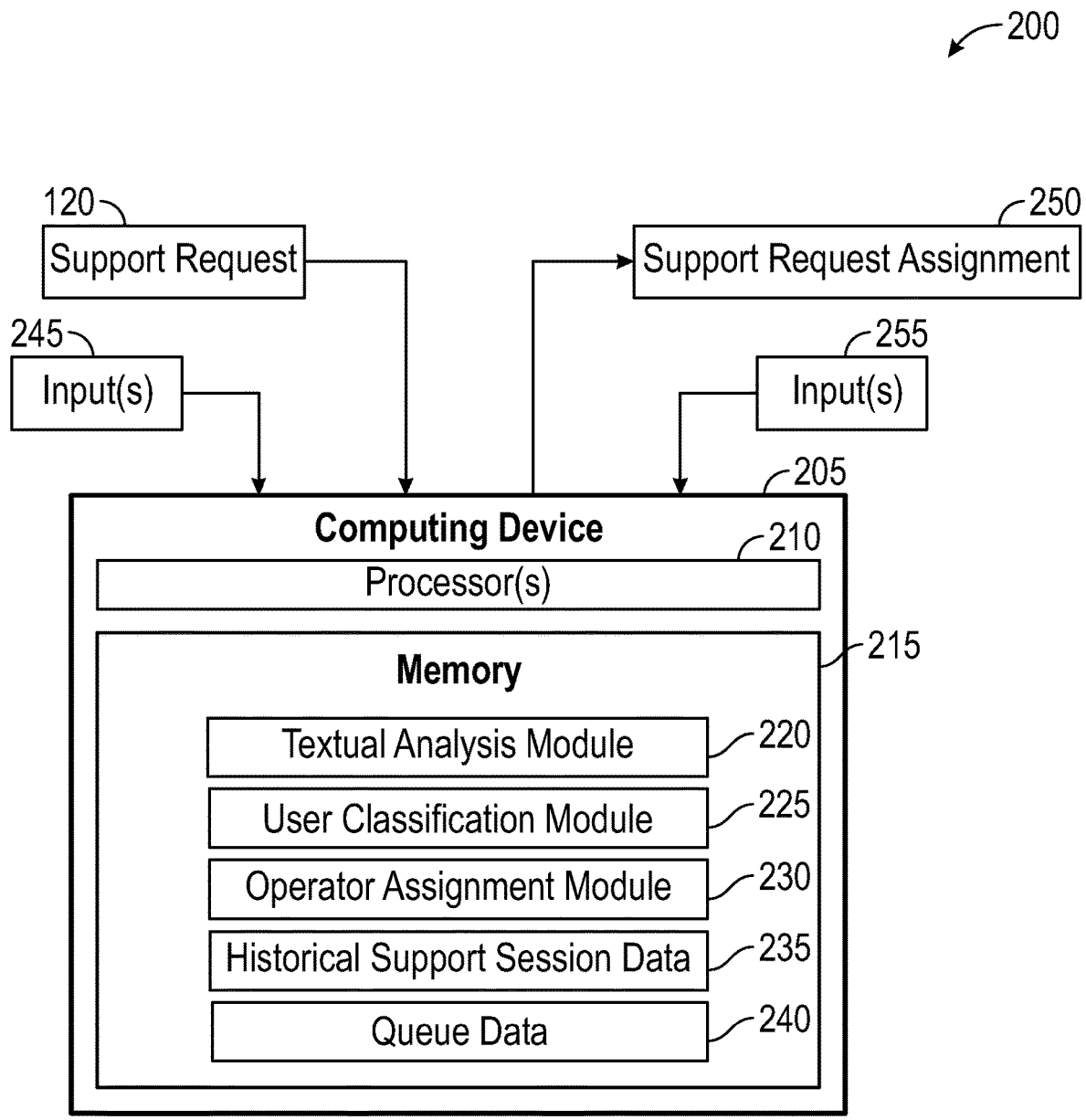
FIG. 2 is a diagram of an exemplary computing device, according to one or more embodiments.

FIG. 2 is a diagram 200 of an exemplary computing device 205, according to one or more embodiments. The features illustrated in the diagram 200 may be used in conjunction with other embodiments. For example, the computing device 205 may represent one exemplary implementation of the support management device 130 of FIG. 1.

The computing device 205 comprises one or more computer processors 210 (also referred to as "processors 210") and a memory 215. The one or more processors 210 may be implemented in any suitable form, such as a general purpose microprocessor, a controller, an application-specific integrated circuit (ASIC), and so forth. The memory 215 may include a variety of computer-readable media selected for their size, relative performance, or other capabilities: volatile and/or non-volatile media, removable and/or non-removable media, etc.

The memory 215 may include one or more "modules" for performing various functions described herein. In one embodiment, each module includes program code that is executable by the one or more processors 210. However, other embodiments may have functionality that is partially or fully implemented in hardware (i.e., circuitry) or firmware external to the one or more processors 210. As shown, the memory 215 comprises a textual analysis module 220, a user classification module 225, and an operator assignment module 230, although other combinations of the described functionality are also contemplated.

Responsive to receiving the support request 120, the computing device 205 opens a current support session until resolution or other disposition of the support request 120. During the current support session, the textual analysis module 220 performs textual analysis of the support request 120 and/or one or more inputs 245 provided by the user. In some embodiments, the textual analysis module 220 performs textual analysis of the one or more inputs 245 using one or more of intent analysis, complexity analysis, polarity analysis, and timing analysis. In some embodiments, the textual analysis module 220 performs textual analysis of one or more previous support sessions, which may be stored in the memory 215 as historical support session data 235 with any suitable formatting. The textual analysis of the one or more previous support sessions may be in addition to, or alternative to, the one or more inputs 245 of the current support session.

The intent analysis includes suitable algorithms for natural language processing (NLP) topic modeling of the one or more inputs 245 and/or the historical support session data 235, such as Latent Dirichlet Allocation (LDA). The complexity analysis includes suitable algorithms for determining a complexity of the one or more inputs 245 and/or the historical support session data 235, e.g., based on word counts, part-of-speech classes, and so forth. The polarity analysis includes suitable algorithms for determining a sentiment of the user (e.g., characterizing emotions). The timing analysis includes suitable algorithms for determining times between inputs from the user, times between input(s) from the user and input(s) 255 from the support operator, typing speed, use of pauses, and so forth.

The user classification module 225 applies one or more features to a model (or "classifier model") to classify the user into a selected one of a plurality of classes. In some embodiments, the one or more features are determined using the textual analysis module 220. In some cases, the one or more features may include one or more temporal features, such as time intervals between utterances of the user and the support operator. The model of the user classification module 225 may comprise any suitable classifier algorithms, such as support-vector machine (SVM), random forest (RF), artificial neural networks (ANN), and so forth.

Each of the classes describes a respective pace of conversation during the support session. The pace of conversation indicates an urgency (or priority) for the support operator(s) to address the support request 120 or otherwise respond to the user. In some embodiments, the support request 120 is assigned to a respective queue (reflected in queue data 240 stored in the memory 215) corresponding to the class in which the user is classified.

In some embodiments, the plurality of classes comprises three classes: a "slow" class, a "medium" class, and a "fast" class. For example, a user may be classified into the fast class when the textual analysis module 220 indicates that the user is frustrated and very engaged in the conversation to try to resolve the support request 120. Thus, classification in the fast class suggests that the user generates a relatively high load to the assigned support operator, such that the support operator would not be able to serve many more users concurrently. One exemplary technique to determine the engagement of the user is by assessing a typing speed and/or a length of pauses between communications of the support operator and the user (e.g., a mean response time). As a result, the support request of the user may be prioritized over a support request of another user in the "medium" or "low" classes, in an attempt to improve the user's satisfaction. In some embodiments, prioritizing the support request comprises one of addressing the user's support request before another support request, reassigning a support operator to address the support request, and so forth.

In some embodiments, the textual analysis module 220 further determines a phase of the current support session, and the user classification module 225 weights the classifier model based on the determined phase. For example, textual analysis of the conversation between the user and the support operator (e.g., the one or more inputs 245 and the one or more inputs 255) may indicate one of the following exemplary phases: situation understanding (e.g., the support operator generally determines an emotion of the user, a context of the support request 120, a profile of the user, a history of the user reflected in one or more previous support sessions, and a long-term context of the support request 120), hypothesis (e.g., the support operator generally performs proactive intervention), investigation (e.g., the support operator performs empathetic engagement and common sense reasoning), confirmation, and resolution (e.g., the support operator provides a proactive suggestion for avoiding similar problems as the support request 120).

In one example, in the situation understanding and confirmation phases the weights may be set to predefined values that are compatible with classifying the user in the fast class, since the support request 120 may be addressed using automatized module such as a chatbot. In another example, if the user is determined to be angry (e.g., using strong or curt language, typing faster) or the support request 120 addresses a same problem as a previous support request from the user, the weights may be set to higher values to classify the user in the fast class. Thus, emotion and history may be more influential than other user aspects (e.g., profile information).

Upon receiving the support request 120, the user classification module 225 may identify the user and access the historical support session data 235 for one or more previous support sessions for the user. In some embodiments, the user classification module 225 provides an initial classification of the user in the current support session using the historical support session data 235.

In some embodiments, the initial classification of the user is based on the textual analysis of the one or more previous support sessions corresponding to the user (e.g., included in the historical support data 235). In some embodiments, the historical support session data 235 includes one or more previous classifications for the user. In one example, the user may be initially classified in the fast class for the current support session when a last classification of the user in a most recent support session is also the fast class. In another example, the user may be initially classified in the fast class when an average of the classifications in the most recent support session (or across multiple previous support sessions) is also the fast class. In another example, the user may be initially classified in the fast class when a highest classification in the most recent support session (or across multiple support sessions) was the fast class, and so forth.

In other cases, the initial classification of the user need not be the same as the previous classification(s) used to make the determination. For example, the initial classification of the user may be based on classification(s) of previous support session(s) exceeding a threshold value, a trend of changes to the classifications during previous support session(s), and so forth. This may be beneficial for prioritizing support requests from users who have had complex support request(s), experienced dissatisfaction, etc. during previous support sessions.

In some embodiments, the plurality of classes further comprises an "undefined" or default class. The user may be classified in the undefined class in cases where the user is not identified and/or the historical support session data 235 does not reflect previous support sessions for the user.

Although a scheme is described above as having three classes (slow, medium, and fast) and optionally an undefined class, alternate implementations having different numbers of classes reflecting different paces of conversation are also contemplated. For example, another scheme may classify users into a selected one of priority and non-priority classes.

Based on the classification of the user, in some embodiments, the user classification module 225 assigns the support request 120 to a queue associated with the class. For example, using the exemplary scheme discussed above, the queue data 240 may comprise four (4) queues corresponding to each of the slow, medium, fast, and undefined classes.

In some embodiments, the user classification module 225 dynamically updates the classification of the user during the current support session based on the one or more inputs 245 from the user and/or the one or more inputs 255 from the support operator assigned to the support request 120. The user classification module 225 may further update the queue data 240 to reflect the updated classification of the user. For example, the support request 120 may be moved from a first queue to a second queue responsive to an updated classification, promoted or demoted within a same queue, and so forth.

Based on the queue data 240, the operator assignment module 230 assigns fulfillment of the support request 120 to a support operator. In some embodiments, the operator assignment module 230 transmits a support request assignment 250 for the support request 120, e.g., to the computing device of the assigned support operator, or notifying other support operators that the support request 120 was assigned to the assigned support operator.

As discussed above, the user classification module 225 may dynamically update the classification of the user during the current support session. In some embodiments, the operator assignment module 230 may change the support operator assignment based on the updated classification. In some embodiments, the operator assignment module 230 may further change the support operator assignment based on a loading of the assigned support operator or other support operators. In one example, the support request 120 may be reassigned when the assigned support operator is assigned to too many support requests, too many support requests of a particular class (e.g., it may be difficult for a single operator to adequately address too many "fast" class support requests), and so forth. In another example, the support request 120 may be reassigned when another support operator has availability (e.g., after resolving another support request), when another support operator is more experienced than the currently assigned support operator, and so forth.

Figure 3:
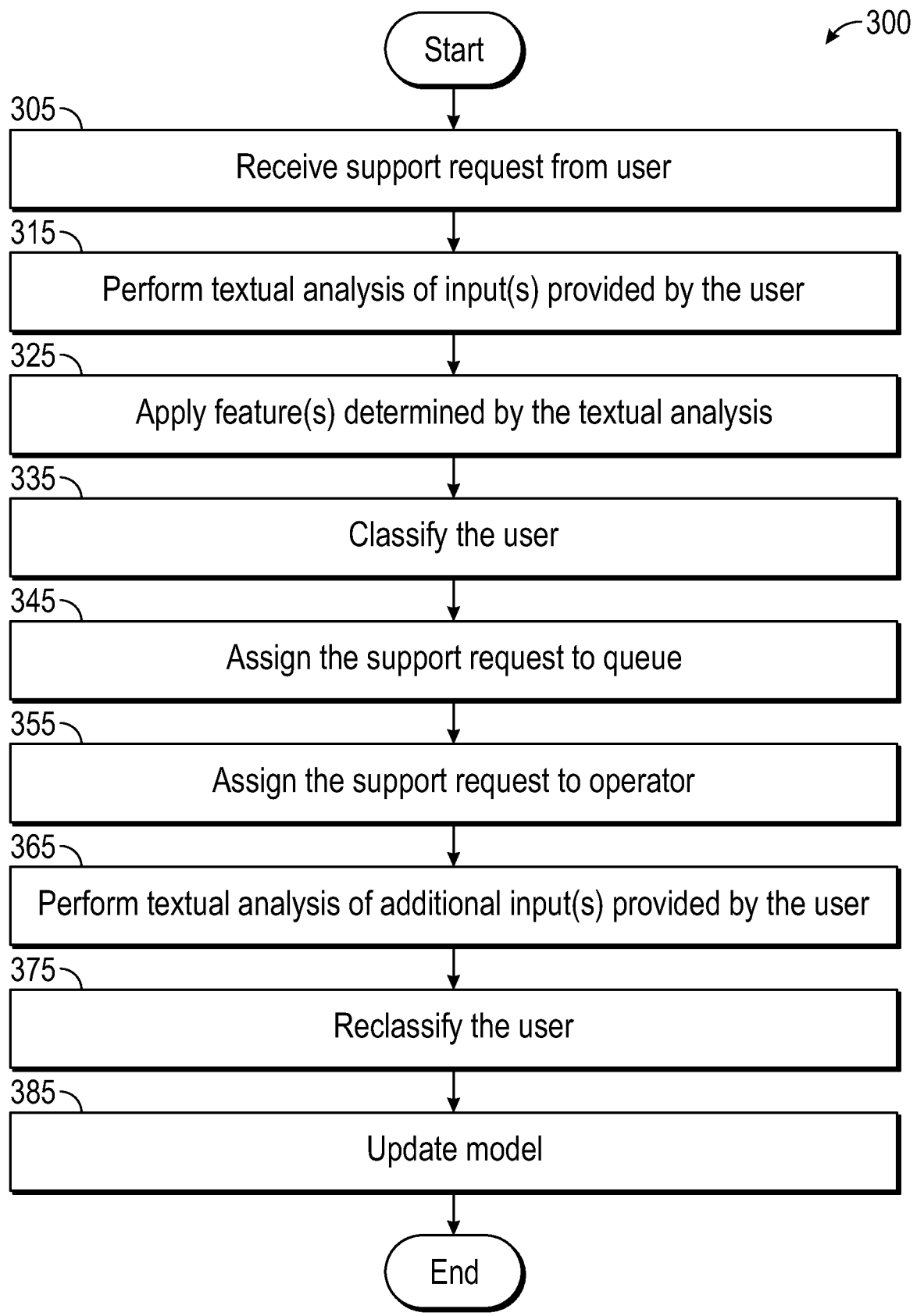
FIG. 3 illustrates an exemplary method of assigning a support request to an operator using a pace of conversation, according to one or more embodiments.

FIG. 3 illustrates an exemplary method 300 of assigning a support request to an operator using a pace of conversation, according to one or more embodiments. The method 300 may be used in conjunction with other embodiments. For example, the method 300 may be performed by the support management device 130 of FIG. 1.

The method 300 begins at block 305, where the support management device receives a support request from a user. In some embodiments, the support management device 130 opens a support session responsive to the support request, and maintains the support session until resolution of the support request. At block 315, the support management device performs textual analysis of one or more inputs provided by the user. In some embodiments, the textual analysis comprises one or more of intent analysis, complexity analysis, polarity analysis, and timing analysis. In some embodiments, the textual analysis further comprises determining a phase of the current support session, and the and the support management device weights the classifier model based on the determined phase.

At block 325, the support management device applies one or more features determined by the textual analysis. In some embodiments, the one or more features are applied to a classifier model, which classifies the user into a selected one of a plurality of classes at block 335. In some embodiments, the classifier model comprises one of the following algorithms: support-vector machine (SVM), random forest (RF), artificial neural network (ANN). In some embodiments, each of the classes describes a respective pace of conversation during the support session.

At block 345, the support request is assigned to a queue corresponding to the class in which the user is classified. At block 355, the support request is assigned to a support operator. At block 365, textual analysis is performed on one or more additional inputs provided by the user. The one or more additional inputs may correspond to a conversation between the user and the support operator during the current support session.

At block 375, the user is reclassified based on the textual analysis on the one or more additional inputs. In some embodiments, the support request is reassigned to another support operator responsive to the reclassification of the user. At block 385, the model is updated. In some embodiments, weights of the classifier model are updated based on a determined phase of the current support session. The method 300 ends following completion of the block 385.

Figure 4:
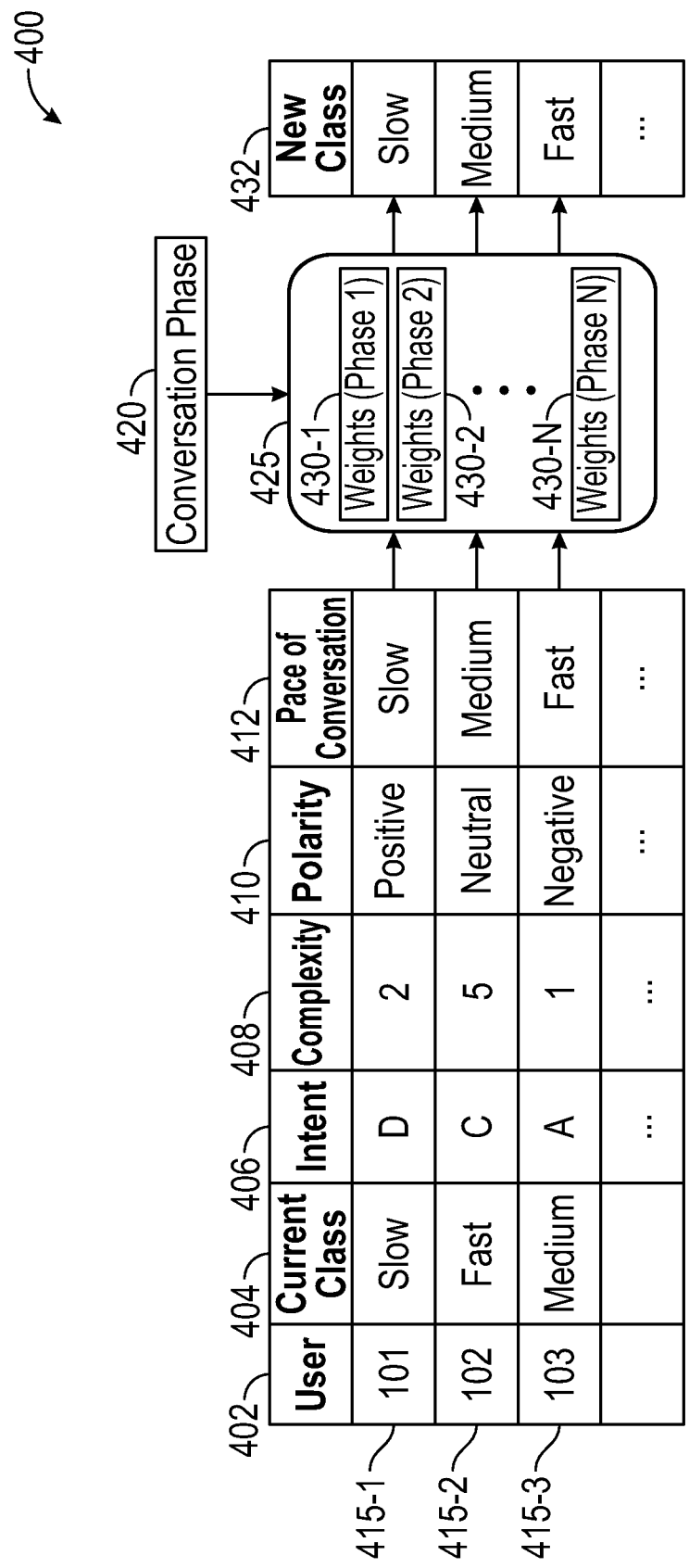
FIG. 4 is a diagram illustrating reclassifying a user, according to one or more embodiments.

FIG. 4 is a diagram 400 illustrating reclassifying a user, according to one or more embodiments. The features illustrated in the diagram 400 may be used in conjunction with other embodiments. For example, the diagram 400 may represent exemplary operation of the support management device 130 of FIG. 1 to manage support sessions for addressing support requests.

Three support sessions 415-1, 415-2, 415-3 are shown in the diagram 400, each of which is requested by different users 101, 102, 103. The support management device maintains a user field 402, a current class field 404, an intent field 406, a complexity field 408, a polarity field 410, and a pace of conversation field 412 for each of the support sessions 415-1, 415-2, 415-3. The support session 415-1 corresponds to the user 101 who is initially classified in a "slow" class. As discussed above, in some cases this initial classification may be determined based on one or more previous support sessions of the user 101. The textual analysis of the conversation (including one or more inputs from the user and/or one or more inputs from the support operator) during the support session 415-1 determines one or more features: an intent "D", a complexity "2" of the support request, and a "positive" polarity (or sentiment) of the user.

The intent field 406 generally represents a type of the action to be performed by the support operator to resolve the support request. In one example, an intent "A" corresponds to changing a password, an intent "B" corresponds to reporting a stolen card, an intent "C" corresponds to cancelling a subscription, and so forth.

The complexity field 408 generally represents one or more textual metrics such as a number of words, a number of adjectives, and so forth. The different scales for the values of the intent field 406, the complexity field 408, the polarity field 410, etc. influences how important those features are for determining the pace of conversation 412.

In some embodiments, the support management device determines the pace of conversation of the support session 415-1 ("slow") using the one or more features. The determination of the pace of conversation may be rule-based or model-based.

The support session 415-2 corresponds to the user 102 who is initially classified in a "fast" class. The textual analysis of the conversation (including one or more inputs from the user and/or one or more inputs from the support operator) during the support session 415-2 determines one or more features: an intent "C", a complexity "5" of the support request, and a "neutral" polarity (or sentiment) of the user. Using the one or more features, the pace of conversation is determined to be "medium" for the support session 415-2.

The support session 415-3 corresponds to the user 103 who is initially classified in a "medium" class. The textual analysis of the conversation (including one or more inputs from the user and/or one or more inputs from the support operator) during the support session 415-3 determines one or more features: an intent "A", a complexity "1" of the support request, and a "negative" polarity (or sentiment) of the user. Using the one or more features, the pace of conversation is determined to be "fast" for the support session 415-3.

The one or more features are applied to a classifier model 425 to classify the user into a class that describes a pace of conversation during the respective support session 415-1, 415-2, 415-3. In some embodiments, the current class of the user and/or the pace of conversation are also provided as specific inputs to the classifier model 425. In other embodiments, the classifier model 425 does not receive the current class or the pace of conversation as specific inputs, but the output classification by the classifier model 425 represents the pace of conversation. The support management device further maintains a new class field 432 for each of the support sessions 415-1, 415-2, 415-3, which represents the new classification of the user based on the output of the classifier model 425. Although the values of the new class field 432 are shown as being the same as the values of the pace of conversation, other examples may have different values. For example, a difficult task (e.g., based on the intent field 406) with a "medium" pace of conversation 412 may result in the new class 432 being assigned as "slow" because the expectation is that the support operator may require more time to resolve the support request. In another example, a simple task with a "medium" pace of conversation may result in the new class 432 being assigned as "fast" because the expectation is that the support request may be resolved more quickly.

In some embodiments, one or more weights of the classifier model 425 that are applied for each of the support sessions 415-1, 415-2, 415-3 are selected based on a conversation phase 420 of the respective support session 415-1, 415-2, 415-3. The different phases reflected in the conversation phase 420 generally represent different progress (or status) of resolving the support request. The conversation phase 420 may be determined based on textual analysis of the respective support session 415-1, 415-2, 415-3. As shown, a plurality of weights 430-1, 430-2, ..., 430-N may be selected for the classifier model 425, corresponding to N predefined phases. For example, assuming the support session 415-1 is determined to be in Phase 1, the corresponding weights 430-1 are selected and applied to the classifier model 425 for the support session 415-1. As discussed above, one example set of phases includes situation understanding, hypothesis, investigation, confirmation, and resolution.

Using the classifier model 425 and the respective weights 430-1, 430-2, ..., 430-N, the support session 415-1 remains classified as "slow" class, the support session 415-2 has changed classification from "fast" class to "medium" class, and the support session 415-3 has changed classification from "medium" class to "fast" class. In this way, the support request for the support session 415-3 may be dynamically prioritized above the support request for the support session 415-2, which may improve overall customer satisfaction by more responsively addressing the "fast" pace of conversation and the user's "negative" polarity in the support session 415-3.

As discussed above, prioritizing a support request over others may include reassigning the support request into a different queue. For example, responsive to the reclassification, the support request for the support session 415-3 may be reassigned from a first queue containing the "medium" class support requests to a second queue containing the "fast" class support requests.

Figure 5:
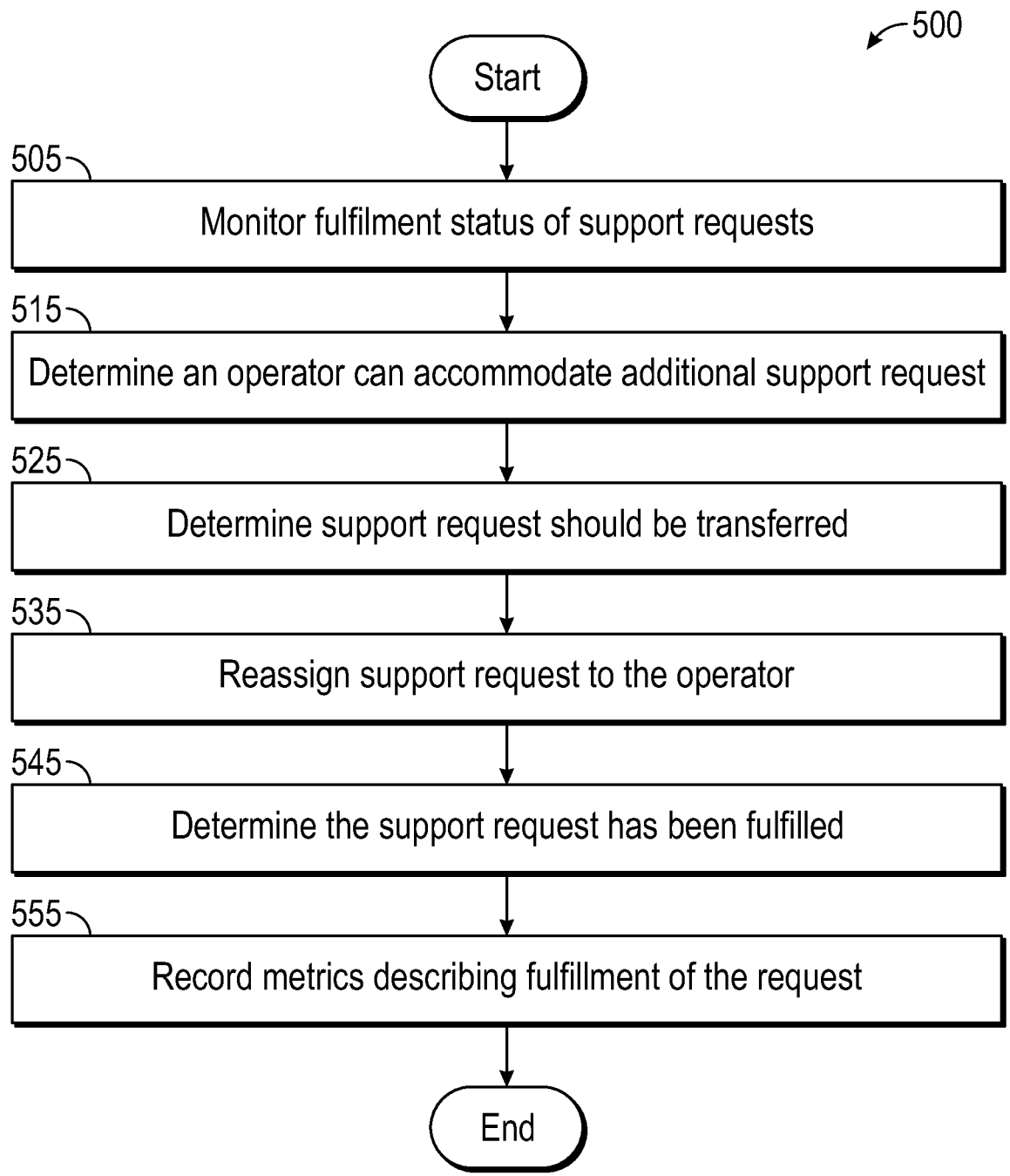
FIG. 5 illustrates an exemplary method of reassigning a support request, according to one or more embodiments.

Regardless of whether the support request is reassigned into a different queue, prioritizing the support request over others may include reassigning the support request to be fulfilled by another support operator. FIG. 5 illustrates an exemplary method 500 of reassigning a support request, according to one or more embodiments. The method 500 may be used in conjunction with other embodiments. For example, the method 500 may be performed by the operator assignment module 230 of FIG. 2.

The method 500 begins at block 505, where the operator assignment module monitors fulfillment status of support requests. The support requests may be assigned to a plurality of support operators. In some embodiments, monitoring the fulfillment status may include performing textual analysis of the various support sessions corresponding to the support requests, determining the phases of the support sessions, and so forth.

At block 515, the operator assignment module determines that a first support operator can accommodate an additional support request. In some embodiments, this determination is responsive to the first support operator resolving another support request, the reassignment of another support request to a second support operator, the reclassification of another support request of the first support operator to a lower priority level (e.g., from "high" class to "medium" class), and so forth.

At block 525, the operator assignment module determines that the support request should be transferred from the second support operator. In some embodiments, this determination is responsive to the second support operator receiving another support request, the reclassification of another support request of the second support operator to a higher priority level (e.g., from "medium" class to "high" class), and so forth.

At block 535, the operator assignment module reassigns the support request to the first operator. At block 545, the operator assignment module determines that the support request has been fulfilled. At block 555, the operator assignment module records metrics describing fulfillment of the request. In some embodiments, the metrics comprise one or more of user satisfaction (e.g., through direct prompting of the user), pace of conversation information, changes of classification during the support session, support operator satisfaction, and system throughput. The method 500 ends following completion of the block 555.

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
receiving a support request from a user;
during a current support session responsive to the support request, performing textual analysis of one or more inputs provided by the user during one or both of: (i) the current support session and (ii) one or more previous support sessions, wherein the textual analysis comprises polarity analysis and timing analysis of the one or more inputs, wherein the timing analysis comprises determining a mean response time of the user to communications from a first operator of a predefined plurality of support operators that is assigned to the current support session;
determining, using the textual analysis, one or more features of the one or more inputs, wherein the one or more features include a satisfaction level of the user based on the polarity analysis, and an engagement level of the user based on the mean response time;
applying the one or more features to a classifier model to classify the user into a first class of a predefined plurality of classes that describe a pace of conversation during the current support session; and
based on the classification of the user, assigning the support request to be fulfilled by the first operator or a second operator of the predefined plurality of support operators.

2. The computer-implemented method of claim 1, further comprising:
performing textual analysis of one or more additional inputs provided by the user during the current support session, wherein the one or more additional inputs correspond to a conversation between the user and the first operator; and
reclassifying the user into a second class of the plurality of classes.

3. The computer-implemented method of claim 2, further comprising:
responsive to reclassifying the user, reassigning the support request to be fulfilled by a second operator of the predefined plurality of support operators.

4. The computer-implemented method of claim 2, further comprising:
determining a phase of the current support session based on the textual analysis of the one or more additional inputs, wherein the phase is selected from a predefined plurality of phases comprising one or more of the following: situation understanding, hypothesis, investigation, confirmation, and resolution; and
adjusting one or more weights of the classifier model based on the phase.

5. The computer-implemented method of claim 1, wherein the textual analysis of the one or more inputs extracts the one or more features using one or more of the following:
intent analysis; and
complexity analysis.

6. The computer-implemented method of claim 1, further comprising:
based on the classification of the user, assigning the support request to a queue associated with the first class,
wherein the support request is assigned to the first operator from the queue.

7. The computer-implemented method of claim 1, further comprising:
updating the classifier model based on feedback at the conclusion of the current support session.

8. A system comprising:
one or more computer processors configured to perform an operation comprising:
receiving a support request from a user;
during a current support session responsive to the support request, performing textual analysis of one or more inputs provided by the user during one or both of: (i) the current support session and (ii) one or more previous support sessions, wherein the textual analysis comprises polarity analysis and timing analysis of the one or more inputs, wherein the timing analysis comprises determining a mean response time of the user to communications from a first operator of a predefined plurality of support operators that is assigned to the current support session;
determining, using the textual analysis, one or more features of the one or more inputs, wherein the one or more features include a satisfaction level of the user based on the polarity analysis and an engagement level of the user based on the mean response time;
applying the one or more features to a classifier model to classify the user into a first class of a predefined plurality of classes that describe a pace of conversation during the current support session; and
based on the classification of the user, assigning the support request to be fulfilled by the first operator or a second operator of the predefined plurality of support operators.

9. The system of claim 8, the operation further comprising:
performing textual analysis of one or more additional inputs provided by the user during the current support session, wherein the one or more additional inputs correspond to a conversation between the user and the first operator; and
reclassifying the user into a second class of the plurality of classes.

10. The system of claim 9, the operation further comprising:
responsive to reclassifying the user, reassigning the support request to be fulfilled by a second operator of the predefined plurality of support operators.

11. The system of claim 9, the operation further comprising:
determining a phase of the current support session based on the textual analysis of the one or more additional inputs, wherein the phase is selected from a predefined plurality of phases comprising one or more of the following: situation understanding, hypothesis, investigation, confirmation, and resolution; and
adjusting one or more weights of the classifier model based on the phase.

12. The system of claim 8, wherein the textual analysis of the one or more inputs extracts the one or more features using one or more of the following:
- intent analysis; and
- complexity analysis.

13. The system of claim 8, the operation further comprising:
- based on the classification of the user, assigning the support request to a queue associated with the first class,
- wherein the support request is assigned to the first operator from the queue.

14. The system of claim 8, the operation further comprising:
- updating the classifier model based on feedback at the conclusion of the current support session.

15. A computer program product comprising:
- a computer-readable storage medium having computer-readable program code embodied therewith, the computer-readable program code executable by one or more computer processors to perform an operation comprising:
  - receiving a support request from a user;
  - during a current support session responsive to the support request, performing textual analysis of one or more inputs provided by the user during one or both of: (i) the current support session and (ii) one or more previous support sessions, wherein the textual analysis comprises polarity analysis and timing analysis of the one or more inputs, wherein the timing analysis comprises determining a mean response time of the user to communications from a first operator of a predefined plurality of support operators that is assigned to the current support session;
  - determining, using the textual analysis, one or more features of the one or more inputs, wherein the one or more features include a satisfaction level of the user based on the polarity analysis and an engagement level of the user based on the mean response time;
  - applying the one or more features to a classifier model to classify the user into a first class of a predefined plurality of classes that describe a pace of conversation during the current support session; and
  - based on the classification of the user, assigning the support request to be fulfilled by the first operator or a second operator of the predefined plurality of support operators.

16. The computer program product of claim 15, the operation further comprising:
- performing textual analysis of one or more additional inputs provided by the user during the current support session, wherein the one or more additional inputs correspond to a conversation between the user and the first operator; and
- reclassifying the user into a second class of the plurality of classes.

17. The computer program product of claim 16, the operation further comprising:
- responsive to reclassifying the user, reassigning the support request to be fulfilled by a second operator of the predefined plurality of support operators.

18. The computer program product of claim 16, the operation further comprising:
- determining a phase of the current support session based on the textual analysis of the one or more additional inputs, wherein the phase is selected from a predefined plurality of phases comprising one or more of the following: situation understanding, hypothesis, investigation, confirmation, and resolution; and
- adjusting one or more weights of the classifier model based on the phase.

19. The computer program product of claim 15, wherein the textual analysis of the one or more inputs extracts the one or more features using one or more of the following:
- intent analysis; and
- complexity analysis.

20. The computer program product of claim 15, the operation further comprising:
- based on the classification of the user, assigning the support request to a queue associated with the first class,
- wherein the support request is assigned to the first operator from the queue.

* * * * *